United States Patent
Im

(10) Patent No.: US 7,577,185 B2
(45) Date of Patent: Aug. 18, 2009

(54) FINGER FOR SYMBOL-RATE WEIGHTING USING IN SMART ANTENNA SYSTEM, AND ITS APPLICATION FOR DEMODULATION APPARATUS AND METHOD

(75) Inventor: Heung-Jae Im, Seoul (KR)

(73) Assignees: SAS Technologies Co., Ltd., Seoul (KR); Industry-University Cooperation Foundation Hanyang University, Seoul (KR)

( * ) Notice: Subject to any disclaimer, the term of this patent is extended or adjusted under 35 U.S.C. 154(b) by 1162 days.

(21) Appl. No.: 10/814,223

(22) Filed: Apr. 1, 2004

(65) Prior Publication Data

US 2004/0184428 A1 Sep. 23, 2004

Related U.S. Application Data

(63) Continuation of application No. PCT/KR02/01912, filed on Oct. 11, 2002.

(30) Foreign Application Priority Data

Oct. 11, 2001 (KR) ................................ 2001-62792

(51) Int. Cl.
*H04B 1/00* (2006.01)
(52) U.S. Cl. .................... 375/147; 375/148; 375/150
(58) Field of Classification Search ........... 375/136, 375/142, 144, 147, 148, 149, 150
See application file for complete search history.

(56) References Cited

U.S. PATENT DOCUMENTS

| | | |
|---|---|---|
| 2004/0184429 A1* | 9/2004 | Im .............................. 370/342 |
| 2004/0184515 A1* | 9/2004 | Im .............................. 375/148 |
| 2007/0127605 A1* | 6/2007 | Sindhushayana ............ 375/341 |

FOREIGN PATENT DOCUMENTS

| | | |
|---|---|---|
| JP | 1998-308689 | 11/1998 |
| JP | 2000-324016 | 11/2000 |
| WO | 00/31909 | 6/2000 |
| WO | 01/41318 | 6/2001 |
| WO | 01/67627 | 9/2001 |

* cited by examiner

*Primary Examiner*—Emmanuel Bayard
(74) *Attorney, Agent, or Firm*—Lowe Hauptman Ham & Berner, LLP

(57) ABSTRACT

The present invention relates to a finger using symbol-rate weighting in Smart Antenna System, and an apparatus and method for Demodulating signals using such a finger. The present invention is useful in a wireless communication network having a reverse pilot channel. Further, by using such a finger, the present invention provides a demodulation apparatus and method for making high-speed broadband communications available in a smart antenna system. In such 3-G wireless communications where both traffic signals and pilot signals are transmitted from a terminal, the present invention calculates optimized weight vectors using the pilot signal and the calculated weight vectors are adapted to each traffic signal with a symbol-rate weight.

26 Claims, 14 Drawing Sheets

FINGER FOR SYMBOL-RATE WEIGHTING USING IN SMART ANTENNA SYSTEM, AND ITS APPLICATION FOR DEMODULATION APPARATUS AND METHOD

This is a continuation of PCT/KR02/01912 filed Oct. 11, 2002 and published in English.

TECHNICAL FIELD

This invention relates to a demodulation technique performing a signal reception in mobile communication environments, e.g., Code Division Multiple Access (CDMA)-type mobile communication, etc. More specifically, this invention relates to a finger that is applicable to smart antenna system with symbol-rate weighting, a demodulation apparatus and method that applies the finger, and a computer-readable recording medium for recording a program that embodies the method.

BACKGROUND ART

The importance of smart antenna system is widely recognized as a tool for efficiently increasing the capacity of mobile communication system. In general, it has been known that the smart antenna system enhances the performance of wireless communication system through a spatially selective reception, which causes the interfering signals to be reduced or resolved.

In conventional cases, the weighting information needed in smart antenna system is obtained from the traffic channel in reverse link. The intrinsic characteristic of the traffic channel that the integration interval for despreading procedure cannot be taken long enough, however, the information cannot help being deteriorated.

In order to resolve this problem, there was a Korean Patent No. 239177 registered on Oct. 19th of 1999 entitled, "Receiving Apparatus and Method of Smart Antenna using Pilot Signals in CDMA Mobile Telecommunication System." In the Korean patent 239177, the signal at each antenna element is multiplied by an adaptive weight and combined to produce array output. The output is despreaded with the PN code and properly filtered. In order to produce the reference signal, however, the filtered signal is multiplied again by the same PN code. The technique disclosed in the patent 239177 is based on error signal produced from the difference between the array output and the reference signal. The adaptive procedure produces the weights to be multiplied by the received signals at the multiple numbers of antenna elements by minimizing the error signal by means of well-known technique, Least Mean Square algorithm.

The problem in this method, however, is in executing the LMS algorithm which essentially needs the reference signal for producing the difference to be minimized at each adaptation step. In fact, the procedure of multiplying the PN code to the despreaded received signal is needed only to produce the reference signal. It is absolutely irrelevant to the reception or demodulation procedure itself. The procedure of producing the reference signal must cause additional delays and errors as well as the complexity due to PN-code multiplication.

As another technique, there is a Korean patent application 1999-28020 which has been published on Feb. 5th of 2001, entitled "CDMA Signal Demodulator for an adaptive smart antenna system." In this invention, CDMA signal demodulator in the adaptive smart antenna system consists of a searcher bank for PN-code acquisition, a finger bank which produces accurate timing information, a correlator bank which produces the despreaded data, a beam-forming parameter computer which produces the weights to be multiplied to received signal, a beam-forming multiplier which produces the array output by multiplying the weights to the received signal, and a multipath combiner which aligns the despreaded data in time domain.

The problem in this technique is that it does not provide how each block (or, equivalently, bank) co-operates and interfaces to each other. One practical phenomenon caused by that defect is the initial PN-code acquisition cannot be achieved. In order for the smart antenna system shown in the Korean patent application 1999-28020 to work as properly as claimed, it should be assumed that all the timing information needed at each block must be provided externally, which is not true in real situations. For example, both initial PN-code acquisition and multipath searching should somehow be achieved apriori at the beginning stage, which is never realistic in practical situations, for the correlator bank to work properly. More specifically, the technique disclosed in the Korean patent application 1999-28020 fails to provide how the timing information is provided from the searcher bank to the correlator bank and the beam-forming parameter computer such that the correlation for despreading the received signal and computing the weights at a proper time cannot be achieved. Also, without specifying the detailed method of PN-code acquisition, multipath combining, which is essential in CDMA receiver, can never be achieved as well.

Therefore, the system shown in the Korean patent application 1999-28020 must start with inaccurate timing information at the beginning stage, which results in extremely adverse reliability. In addition, inaccurate timing information results in tremendously slow convergence in adapting the weights even if it can converge. Mostly, it does not converge at all.

Another technique is disclosed in a Korean patent application 1999-30463 published on Feb. 15th of 2001, entitled "Smart Antenna System having a beam-former and an adaptive equalization combiner for multipath signals." The main part of this technique is that a beam-forming can be achieved through an adaptive beam-forming algorithm instead of selection diversity through the searcher bank.

In this technique as well as in the previous ones, there is no explanation about how the timing information is obtained. More specifically, it is assumed in this technique that the searching is perfectly obtained apriori at the beginning stage, i.e., stage before the despreading procedure for the symbol-level weighting, which is never true in real situations. As in the previous case, i.e., 1999-28020, the inaccurate timing information due to the lack of specified searching technique must cause very slow converge in the adaptation of weights even if the procedure does not diverge. The slow convergence leads to a serious degradation in performance of smart antenna system.

In addition, this technique fails to disclose for any normal people with common knowledge to understand how the adaptive beam-forming algorithm searches for said weights.

DISCLOSURE OF INVENTION

The present invention has been proposed to resolve the problems in the conventional techniques discussed above. The objective of this invention is to provide a finger with a main emphasis on the application to smart antenna system for tracking of each user and providing high speed wide-band communication by weighting received data carried in traffic channels in symbol-rate with the -weights computed from pilot channel signal in the reverse link.

This invention also provides a demodulation apparatus of smart antenna system using the fingers operating in symbol-rate for tracking of each user and achieving high speed wide-band communication by weighting the received data carried in traffic channels with the weights computed from pilot channel signal in the reverse link.

This invention also provides demodulation methods of smart antenna system using fingers operating in symbol-rate for tracking of each user and achieving high speed wide-band communication by weighting the received data carried in traffic channels with the weights computed from pilot channel signal in the reverse link.

This invention also provides a computer-readable recording medium for recording a program that embodies the method using fingers operating in symbol-rate for tracking of each user and achieving high speed wide-band communication by weighting the received data carried in traffic channels with the weights computed from pilot channel signal in the reverse link.

Those who are skilled in the art of the present invention will easily recognize another purposes and advantages of the present invention from the drawings, detailed description of the invention, and claims.

In accordance with one aspect of the present invention, there is provided a finger operating in symbol-rate, comprising: descrambling means that descrambles base-band received signal using frame time information by multiplying base-band digital signal by PN-code; pilot integrating means that produces pilot signal by integrating descrambled signal from said descrambling means; weight vector computing means that produces weight vector using signals from said descrambling means and said pilot integrating means; pilot weighting means for producing phase compensating signal to compensate phase delay of channel by multiplying the weight vector from said weight vector computing means with the pilot signal; Walsh despreading means for providing received data for each of traffic channels, by integrating multiplied signals each of the channels for corresponding code length time, after multiplying outputs of said descrambling means and corresponding Walsh codes; traffic channels weighting means in symbol-rate for weighting each traffic channel signal from the Walsh dispreading means by using the weight vector; and channel compensation means for compensating phase distortion caused by phase delay to each output of said Walsh despreading means by using output of said pilot weighting means and traffic channels weighting means.

In addition, the finger further comprises tracking means for producing frame tracking information that is used to compensate small changes of said path delay that might occur during communication.

Also, in order to achieve above-mentioned objectives, there is provided a demodulation apparatus that uses fingers operating in symbol-rate for mobile communication system comprising: analog-to-digital converter (ADC) for converting analog signal, which has been frequency-down converted to base-band, to corresponding digital signal through over-sampling procedure; searcher for transmitting a searcher-energy that exceeds preset threshold value to lock detector while the searcher-energy is computed through correlation procedure between output of said ADC and a PN-code corresponding to pilot channel; lock detector for generating signals needed for accurate frame synchronization including frame reset information (f_reset), frame timing information (t_timing), frame death information (f_death) using said correlation energy provided from said searcher; and at least one finger for weighting in symbol-rate traffic channel signals with weights which are obtained from the received data in the pilot channel of the reverse link.

Also, said searcher that is applied in said demodulation apparatus comprises followings: signal processing method for achieving envelope detection of said received data at each antenna channel of a given smart antenna system; adding method for summing up results of envelope detection obtained at said signal processing method; and output method for generating result of said adding method as final output of non-coherent detection.

In order to achieve above-mentioned objectives, this invention also provides a demodulation method using fingers that operates in symbol-rate for mobile communication system, comprising: a first step of descrambling received signal by multiplying a PN-code with a received signal using frame timing information (f_timing); a second step of generating a pilot signal obtained by integrating a descrambled signal in order to use it for computing weights; a third step of computing a weight vector using the descrambled signal and the pilot signal; a fourth step of generating a phase compensating signal to compensate phase delay of channel by multiplying the weight vector with the pilot signal; a fifth step of providing received data for each of traffic channels, by integrating multiplied signals each of the channels for corresponding code length time, after multiplying the descrambled signal and corresponding Walsh codes; a sixth step of weighting each traffic channel signal by using the weight vector of each channel in symbol-rate; and a seventh step of compensating phase distortion due to channel delay by using a phase compensating signal to weighted traffic signal.

In order to achieve above-mentioned objectives, this invention also provides a computer-readable recording medium for recording a program that embodies the method using fingers operating in symbol-rate comprising: a first function of descrambling received signal by multiplying a PN-code with a received signal using frame timing information (f_timing); a second function of generating a pilot signal obtained by integrating a descrambled signal in order to use it for computing weights; a third function of computing a weight vector using the descrambled signal and the pilot signal; a fourth function of generating a phase compensating signal to compensate phase delay of channel by multiplying the weight vector with the pilot signal; a fifth function of providing received data for each of traffic channels, by integrating multiplied signals each of the channels for corresponding code length time, after multiplying the descrambled signal and corresponding Walsh codes; a sixth function of weighting each traffic channel signal by using the weight vector of each channel in symbol-rate; and a seventh function of compensating phase distortion due to channel delay by using a phase compensating signal to weighted traffic signal.

BRIEF DESCRIPTION OF DRAWINGS

The above and other objects and features of the present invention will become apparent from the following description of the preferred embodiments given in conjunction with the accompanying drawings, in which.

BEST MODE FOR CARRYING OUT THE INVENTION

Objectives, characteristics, and merits of this invention described above will be more clarified through explanations given in this section. In explaining this invention, details of conventional techniques that are used in common with this invention have been excluded in this document because, otherwise, it may confuse originalities disclosed only in this invention. This section presents desirable examples applying techniques disclosed in this invention together with figures.

Figure 1:
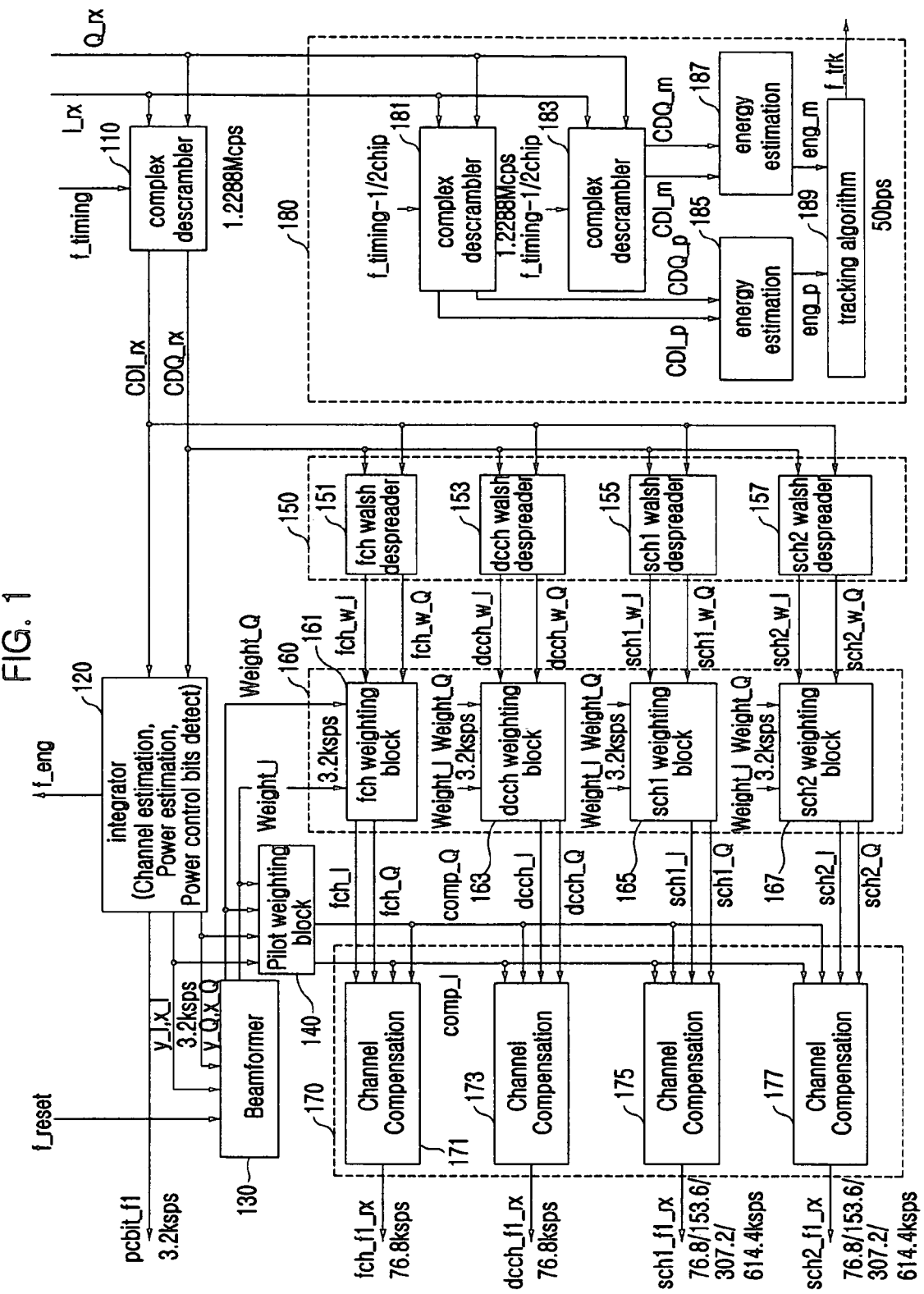
FIG. 1 illustrates one desirable example of a block-diagram of said finger operating in symbol-rate disclosed in this invention.

FIG. 1 illustrates one desirable example of a block-diagram of said finger operating in symbol-rate disclosed in this invention. In FIG. 1, 110, 120, 130, 140, 150, 160, 170, and 180 represent descrambling part, pilot integrating part, weight vector (beam-forming parameter) computing part, pilot weighting part, Walsh despreading part, traffic channels weighting part, channel compensating part, and tracking part, respectively.

As illustrated in figures, said finger according to one example of this invention is composed of following parts: descrambling part (110) that descrambles received signal by multiplying said PN-code with said received signal using said frame timing information provided from outside said finger; pilot integrating part (120) that generates said pilot signal to be used as input of said weight vector computing part by integrating output of said descrambling part (110); weight vector (beam-forming parameter) computing part (130) that computes said weight vector using said descrambled signal and pilot signal provided from said descrambling part (110) and pilot signal generating part, respectively; pilot weighting part (140) that produces phase compensating signal to compensate phase delay of channel by multiplying said weight vector from said weight vector computing part (130) with said pilot signal.

In addition, said finger presented in this invention is also composed of following part: Walsh despreading part (150) that provides received data for each of the traffic channels, (i.e., fundamental channel, dedicate control channel, and supplemental channels in the case of CDMA2000 1X), using outputs of said descrambling part (110) and corresponding Walsh codes; traffic channels weighting part (160) for weighting each traffic channel signal in symbol-rate from said Walsh dispreading part (150); channel compensation part (170) for compensating phase distortion caused by said phase delay to each output of said Walsh despreading part (150) using output of said traffic channels weighting part (160);

Furthermore, this invention also provides said tracking part (180) inside said finger operating in symbol-rate that generates said frame tracking information (f_trk) in order to compensate small change in path delay such that fine-tuning of tracking can be achieved in a given said finger.

Said weight vector computing part (130) provides said beam-forming parameter, i.e., said weight vector, by processing said received signal in accordance with preset arithmetic procedure. Said weight vector is complex-valued vector of which real and imaginary part will be denoted in this document by Weight_I and Weight_Q, respectively. Finger death signal (f_death) is generated in said lock detector in conjunction with said searcher when PN-code acquisition at a given finger is lost. For re-locking of PN-code acquisition when said finger death signal (f_death) occur, f_reset is generated from said lock-detector and said weight vector computing part (130) is in turn reset such that said weight vector computing part (130) is started from initial stage.

When said pilot signal is multiplied by said weight vector, it is desirable to weight said pilot signal through calculation of phase delay, which is delay between reference antenna and each antenna element.

As mentioned earlier, it is extremely important to provide exact timing information, i.e., synchronization between said received signal and local PN-code, for accurate demodulation of CDMA data. Therefore, said tracking part (180) generates said frame tracking information (f_trk) by observing energy difference between early and late descrambling of received signal and local PN-code. Said difference in time lag of early and late correlation is preset with proper amount. Early and late time information will be denoted as first and second sync time information, respectively, in this document.

In said tracking part (180), it is desirable that said first synch time information is to be 0.2 or 0.5 chip duration earlier than said frame timing information (f_timing) while said second synch time information is to be 0.2 or 0.5 chips later.

In said tracking part (180), said timing information is produced from difference between two energies which are obtained by integrating results of said early and late descrambling wherein said first and second synch time information are used, respectively. Or, in said tracking part, said energies corresponding to early and late descrambling can also be generated by squaring weighted sums between said weight vector and integration of said descrambled signal obtained through said early and late descrambling procedure, respectively. Another method in said tracking part is that said energies corresponding too early and late descrambling can also be generated by squaring integration of weighted sums between said weight vector and said descrambled signal obtained through said early and late descrambling procedure, respectively.

For obtaining said frame tracking information (f_trk) in said tracking part (180), some additional processing may also be included in addition to computing said difference of energies of early and late correlations such as low pass filtering of said energy difference.

In a desirable example of this invention, DLL (Digital Lock Loop) has been adopted at each said finger for fine-tracking to countermeasure said small changes in path delay during communication. Through many computer simulations, it has been found that said frame time information (f_timing) is to be changed by ⅓-⅛ chip earlier or later than current value.

For easy explanation of techniques disclosed by this invention, we take demodulation apparatus of CDMA2000 1X as an example of applying said finger.

Figure 2A:
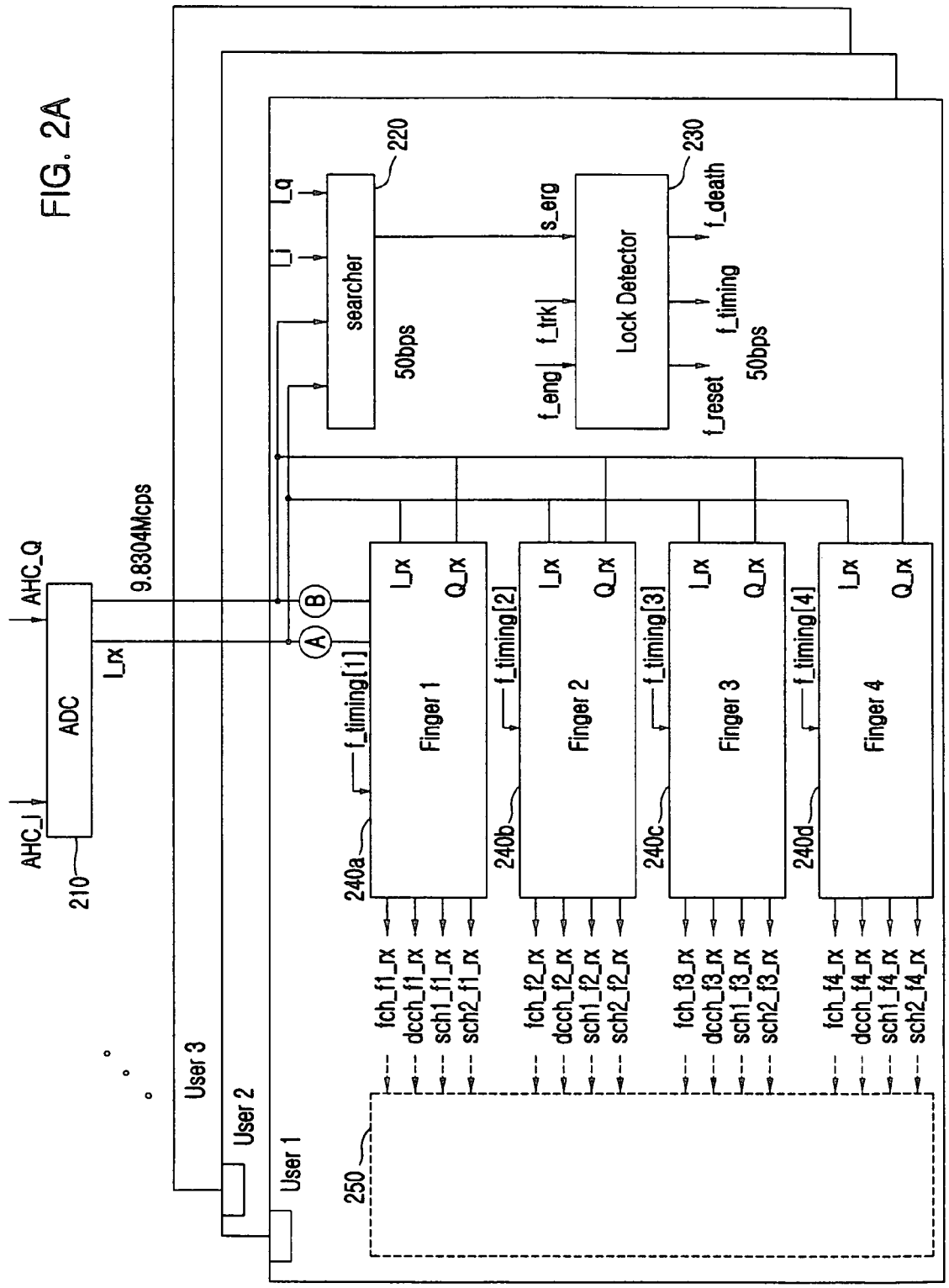
FIG. 2 illustrates one example of a block-diagram of said demodulation apparatus that is equipped with said fingers shown in FIG. 1.

Referring to FIG. 1 that shows one desirable example of said finger structure, said descrambling part (110) performs complex descrambling said received signal of which In-phase and Quadrature-phase component has been respectively scrambled with corresponding PN-code by correlating it with said PN-code using frame timing information (f_timing) provided from said lock detector shown in FIG. 2A.

Said pilot integrating part (120) retrieves said pilot signal in order to compensate phase delay of channel by integrating said descrambled data and output from said pilot integrating part feeds into said weight vector computing part. Said pilot integrating part also detects power control bit and provides frame energy signal (f_eng) to said lock-detector such that current value of said frame energy be transmitted to said lock detector. Output of said pilot integrating part and descrambling part will be denoted as y-vector and x-vector, respectively, in this document. Y-vector is obtained from integration of x-vector and one of x-vector during integration period is fed into weight vector computing part. Depending on said arithmetic procedure of computing said weight vector in said weight vector computing part, only one of x- or y-vector can be used instead of both of them.

Said weight vector computing part (130) produces said weight vector (Weight_I, Weight_Q) using said x-vector and y-vector provided from said descrambling part (110) and pilot integrating part (120), respectively. In addition, said weight vector computing part (130) can also include weight vector initializing part as well. Furthermore, said weight vector computing part (130) can also be equipped with additional part of receiving said frame reset signal (f_reset) from said lock detector (Refer to FIG. 2) in order to reset said weight vector into initial state.

Said general weighting part (140) generates said array output in said symbol-rate by multiplying said received data by said weight vector and summing up results of the multiplications in such a way that said inter-element phase difference between antenna elements to be compensated.

Furthermore, in a desirable example of this invention, said Walsh despreading part (150) comprises following parts: Fundamental channel (which will be referred to as "FCH" for simplicity) Walsh despreading part (151) for retrieving data transmitted through-said FCH by multiplying result of said descrambling of said array output with said Walsh code corresponding to said FCH of length 16 chips such that symbol rate of resultant data to be reduced by ¹⁄₁₆ chip-rate (76.8 kbps); Dedicated control channel (which will be referred to as DCCH for simplicity) Walsh despreading part (153) for retrieving data transmitted through DCCH by multiplying result of said descrambling of said array output by said Walsh code corresponding with said DCCH of length 16 chips such that symbol rate of resultant data to be reduced by ¹⁄₁₆ chip-rate (76.8 kbps); Supplemental channel 1 (which will be referred to as SCH 1 for simplicity) despreading part (155) for retrieving data transmitted through SCH 1 by multiplying result of said descrambling of said array output by said Walsh code corresponding with said SCH 1 of length 16, 8, 4, or 2 chips such that symbol rate of resultant data to be reduced by ¹⁄₁₆, ⅛, ¼, or ½ chip-rate (76.8 kbps, 153.6 ksps, 307.2 ksps, or 614.4 ksps); Supplemental channel 2 (which will be referred to as SCH 2 for simplicity) despreading part (157) for retrieving data transmitted through SCH 2 by multiplying result of said descrambling of said array output said Walsh code corresponding with said SCH 2 of length 16, 8, 4, or 2 chips such that symbol rate of resultant data to be reduced by ¹⁄₁₆, ⅛, ¼, or ½ chip-rate (76.8 kbps, 153.6 ksps, 307.2 ksps, or 614.4 ksps).

Said traffic channels weight part (160) is composed of following parts: FCH weighting part (161) using symbol-rate weighting for compensating phase from reference antenna by weighting said FCH; DCCH weighting part (163) using symbol-rate weighting for compensating phase from reference antenna by weighting said DCCH; SCH 1 weighting part (165) using symbol-rate weighting for compensating phase from reference antenna by weighting said SCH 1; SCH 2 weighting part (167) using symbol-rate weighting for compensating phase from reference antenna by weighting said SCH 2.

Said channel compensating part (170) compensates said phase distortion due to said path delay associated with each of traffic channels separately such that said channel compensating part (170) consists of plural said channel compensating parts. For example, there are four said channel compensating parts (171), (173), (175), and (177) in case of CDMA2000 1X system.

Said tracking part (180) which provides exact chip synchronization through said fine-tuning of PN-code acquisition comprises following parts: complex descrambling part 1 (181) for multiplying said received signal with said PN-code of ½ chip advanced time to f_timing (this descrambling part will be denoted as "early descrambling part" in this document); complex descrambling part 2 (183) for multiplying said received signal with said PN-code of ½ chip retarded time to f_timing (this descrambling part will be denoted as "late descrambling part" in this document); energy estimation parts (185, 187) for providing said correlation energies by integrating results of said complex descrambling part 1 and complex descrambling part 2 (181, 183), respectively; and tracking information (f_trk) generating part (189) for providing said tracking information (f_trk) by comparing magnitudes of results of said energy estimation parts (185, 187). In said descrambling parts, said advanced and retarded time to said f_timing in early and late descrambling part, respectively, can be some other values than ½. In general, it has been found that early and late time can be selected in range of 0.2 to 0.5.

Said energy estimation parts (185, 187) is needed for said fine-tuning of chip synchronization of said local PN-code and said received signal. Integration value of energy level between said received signal and said local PN-code have maximum value in case of perfect chip synchronization.

In said tracking information (f_trk) generating part (189), said tracking information (f_trk) is obtained by comparing said integration values provided from said correlation energy generating parts (185, 187) which are associated with said early and late descrambling part, respectively. Voltage controlled oscillator (VCO) can be used to produce said tracking information (f_trk).

As described above in detail, said finger of CDMA receiver with a main emphasis on the application to smart antenna system makes it possible to track each user and provide high speed wide-band communication by weighting received data carried in said traffic channels in symbol-rate with said weights computed from said pilot channel in the reverse link.

Although there are four said fingers assigned for each user in said demodulation apparatus of said smart antenna system in a desirable example in this document, it is clear to any normal people with common knowledge that number of said fingers assigned to each user can be set to any proper number in a given circumstance.

Figure 2B:
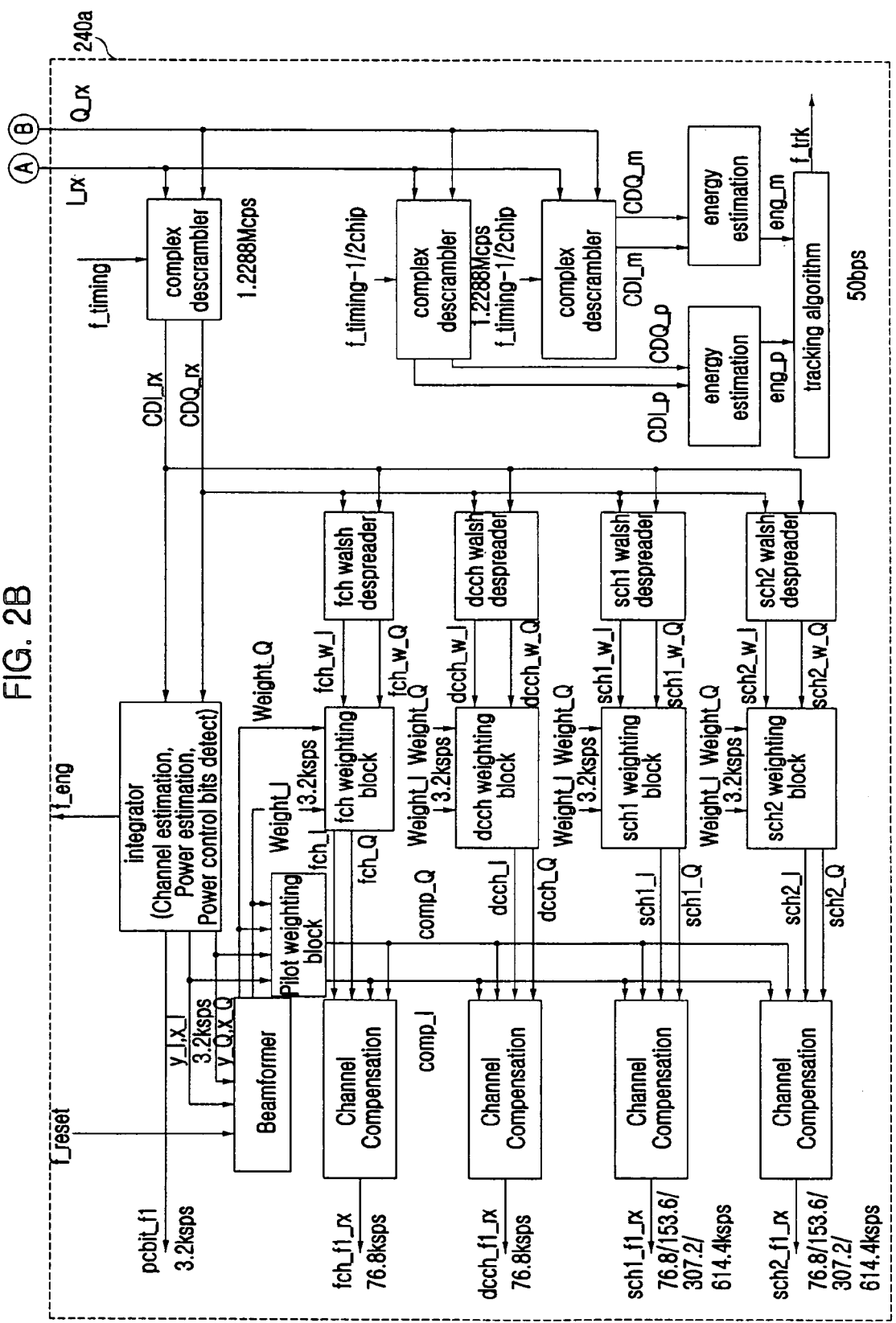

FIG. 2 illustrates an example of applications of said finger disclosed in this invention shown in FIG. 1. It is clear that said finger disclosed in this invention can be applied to said demodulation apparatus operating in any other kind of communication environments such as WCDMA system instead of CDMA2000 1X system. Said demodulation apparatus shown in FIG. 2 comprises said ADC (210), said searcher (220), said lock detector (230), said fingers (240a-240d), and received signal processing part (250).

As shown in FIG. 2, said demodulation apparatus applying said finger operating in symbol-rate comprises said analog-to-digital converter (ADC) for generating said received signal through procedure of oversampling received analog signal after said frequency-down conversion and said searcher (220) for transmitting said searcher-energy (or, equivalently, said correlation energy) that exceeds preset threshold value to lock detector while said searcher-energy is computed through correlation procedure between output of said ADC and said PN-code corresponding to said pilot channel.

In addition, said demodulation apparatus applying said finger operating in symbol-rate also comprises said lock detector (230) for generating signals needed for accurate frame synchronization such as said frame reset (f_reset), said frame timing (f_timing), said frame death (f_death) information using said correlation energy provided from said searcher. As described already in previous explanations of FIG. 1, said demodulation apparatus comprises at least one said finger (240a-240d), which also comprises said descrambling part (110), said pilot integrating part (120), said weight vector computing part (130), said pilot weighting part (140), said Walsh despreading part (150), said traffic channels weighting part (160), said channel compensating part (170), and said tracking part (180) (which is also denoted as "tracker" in this document), and said received signal processing part (250) which performs conventional functions of receiving apparatus such as signal combiner, de-interleaver, soft-decision performer, Viterbi decoder, CRC (cyclic redundancy code) checker, turbo decoder, and/or other kinds of conventional signal receiving, estimating, and/or detecting parts.

Figure 2C:
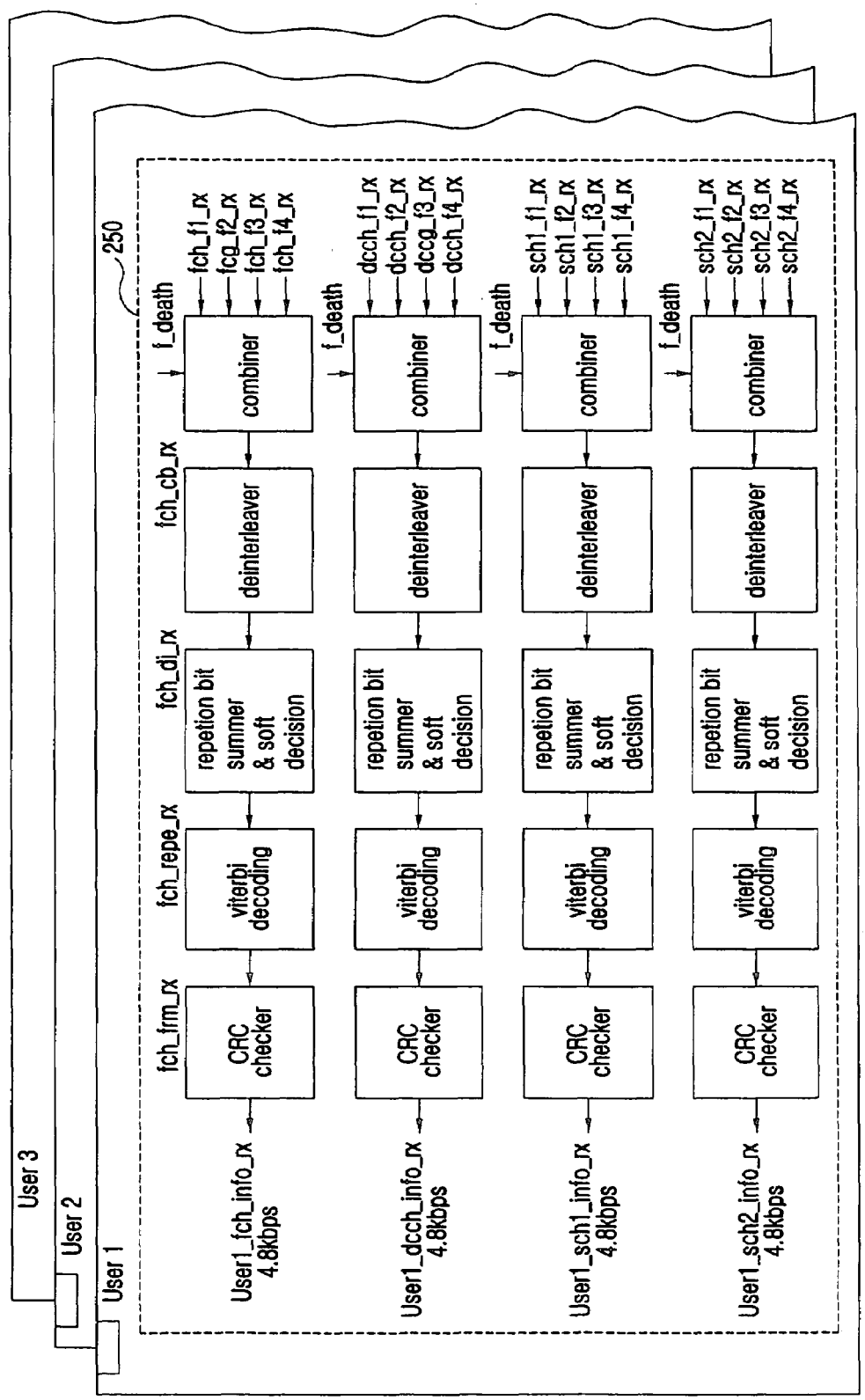

As shown in FIG. 2C, said received signal processing part (250) comprises said signal combiner for combining each of said traffic signals fed from plural said fingers, de-interleaver for rearranging received data back to their original order, soft decision performer for providing said soft decision of said de-interleaved data, said Viterbi decoder for decoding convolutionally encoded data, CRC checker for detecting frame error, etc, of which structure and functions are so conventional to people with knowledge of this field that detailed explanations are omitted in this document.

Furthermore, technology that can appropriately be applied to enhance performance of said searcher (220) without computing said weights has already been submitted as a patent (as of 20971 in Korea) dated as on Apr. 18, 2001.

From here after, more detailed explanations about said finger are provided using related figures.

Figure 3:
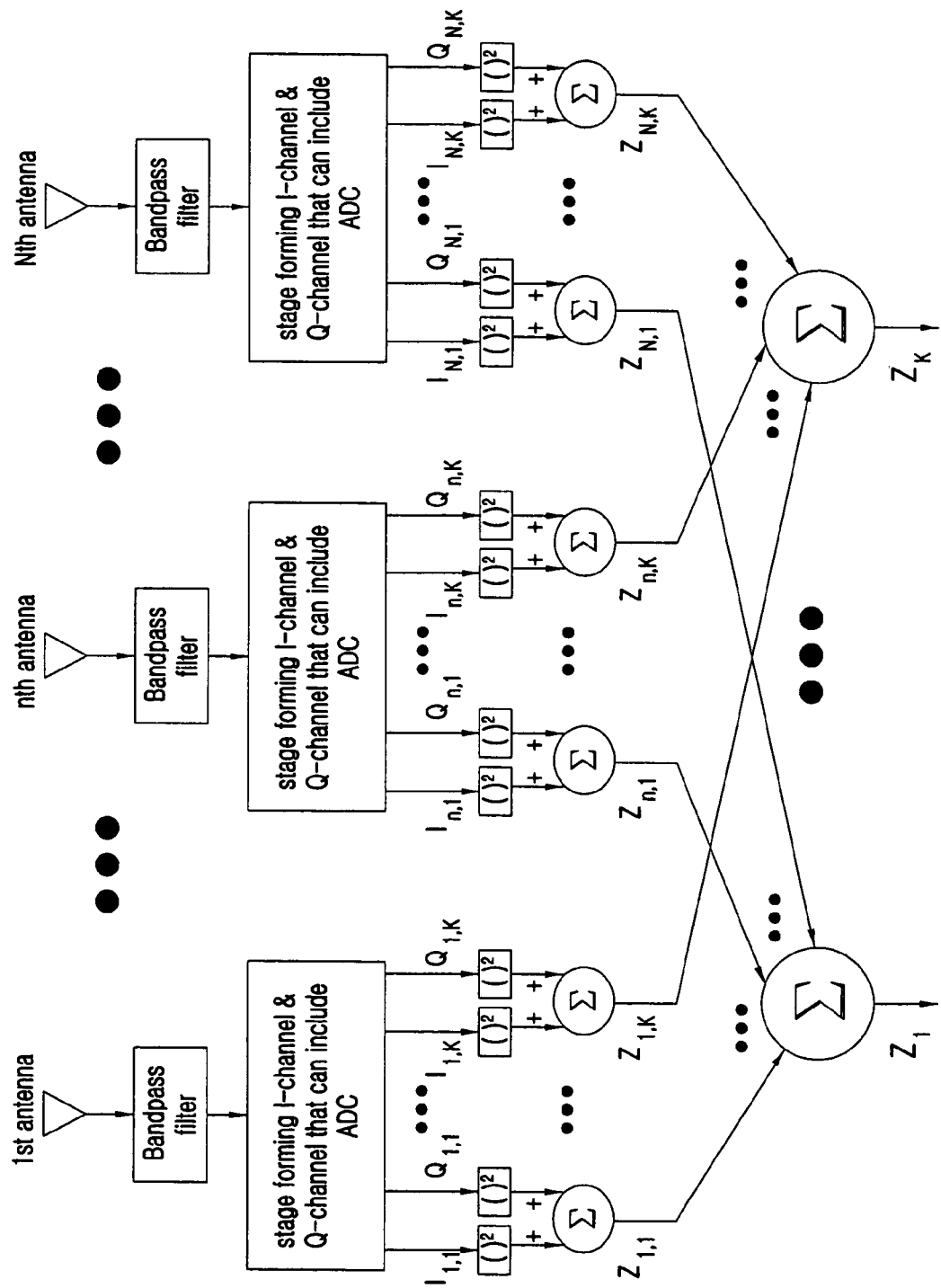
FIG. 3 describes concept of technology, which is referred to as "phase diversity technology," used in said searcher and said tracker disclosed in this invention.

FIG. 3 illustrates a conceptual block diagram for explaining concept of said phase diversity technology that is applied to said searcher (220). For easier explanation, let's take an example from demodulation procedure of received data at n-th antenna element. Said phase diversity that has been applied to said finger disclosed in this invention is explained in more detail from here using related figures that have been obtained through various computer simulations. Suppose there are M waves impinging upon said smart antenna system with distinct incident angles. This corresponds to the case of M users transmitting signals to said smart antenna system assuming no multipath. However, in multipath environment, the number of users is a lot less than M. In either case, the phase difference between two antenna elements in said smart antenna system due to a signal propagated through a single path, say, l-th path, can be written as $\phi(\theta_l, d)$, a function of the incident angle $\theta_l$ and the element separation d. Therefore, $$\text{phase difference} = \phi(\theta_l, d) \quad \text{[EQUATION 1]}$$

Suppose the l-th path carries desired signal, and the first antenna element is reference element. Then, said desired and undesired part of I- and Q-component of said received signal at the k-th branch of said n-th antenna element, denoted by $I_{n,k}$ and $Q_{n,k}$ respectively, can be written as $$I_{n,k} = S_{l,k}\cos[\phi_l + (n-1)\varphi(\theta_l, d)] + \sum_{m=1, m \neq l}^{M} S_{m,k}\cos[\phi_m + (n-1)\varphi(\theta_m, d)] \quad \text{[EQUATION 2]}$$

$$Q_{n,k} = S_{l,k}\sin[\phi_l + (n-1)\varphi(\theta_l, d)] + \sum_{m=1, m \neq l}^{M} S_{m,k}\sin[\phi_m + (n-1)\varphi(\theta_m, d)] \quad \text{[EQUATION 3]}$$

where $\phi_m$ is carrier phase delay associated with the m-th path, and $S_{m,k}$ is the amplitude of said received signal at the k-th branch of said reference antenna element propagated through the m-th path. Note that the first terms of equation (2) and (3) are said desired signals, and the second terms are said interferences since the l-th path carries said desired signal. The noise terms are ignored for the sake of simplicity. If incident angles $\{\theta_m\}$ are assumed to be mutually independent random variables with uniform distribution, then, for sufficiently large M, said interfering terms, i.e., the second terms of equation (2) and (3), are mutually independent Gaussian random variables. Then, equation (2) and (3) can be rewritten as $$I_{n,k} = G[S_{l,k}\cos(\Theta_{n,l}), \sigma^2] \quad \text{[EQUATION 4]}$$

$$Q_{n,k} = G[S_{l,k}\sin(\Theta_{n,l}), \sigma^2] \quad \text{[EQUATION 5]}$$

where $G[\mu, \sigma^2]$ denotes a Gaussian random variable with mean $\mu$ and variance $\sigma^2$ where said variance is determined by the sum of said interferers' power measured at receiving side, and $\Theta_{n,l} = \phi_l + (n-1)\phi(\theta_l, d)$.

Said correlation energy is obtained from squared sum of I- and Q-components for said non-coherent envelope detection. Denoting said correlation energy associated with the k-th branch by $Z_k$, it is claimed in said "Phase diversity technology" (a patent in pending as of 20971 in Korea dated as on Apr. 18, 2001) that each of said correlation energy should be obtained from the sum of all the corresponding I- and Q-components obtained from each antenna element, i.e., $$Z_k = \sum_{n=1}^{N} [I_{n,k}^2 + Q_{n,k}^2] \text{ for } k = 1, 2, \ldots, K \quad \text{[EQUATION 6]}$$

Probability density function (PDF) of said correlation energy $Z_k$ can be written as $$p_{Z_k}(\alpha) = \frac{(\alpha/\sigma^2 b_k)^{(N-1)/2}}{2\sigma^2} e^{-\frac{1}{2}(b_k+\alpha/\sigma^2)} I_{N-1}\left(\sqrt{\frac{b_k \alpha}{\sigma^2}}\right),$$ [EQUATION 7]

for $\alpha \geq 0$ $= 0$, for $\alpha < 0$.

where the non-centrality parameter $b_k =$ $$b_k = N \frac{S_k^2}{\sigma^2}$$

and $I_{N-1}(\cdot)$ is the modified Bessel function of the first kind with order N−1. Note that when $S_k=0$, $b_k$ becomes zero. This means that when the amplitude of said desired signal is zero at the k-th branch. Therefore, when there is no said desired signal at the k-th branch, said correlation energy $Z_k$ is a central chi-squared random variable. For this case, said PDF of said correlation energy $Z_k$ becomes, $$p_{Z_k}(\alpha) = \frac{1}{(\sigma^2)^N 2^N \Gamma(N)} \alpha^{(N-1)} e^{-\alpha/2\sigma^2}$$ [EQUATION 8]

where $\Gamma(\cdot)$ denotes Gamma function.

Said mean of said central chi-square random variable is $2N\sigma^2$ and its variance is $4N\sigma^4$. For the case of non-central Chi-square, said mean is $N(2\sigma^2+S^2)$ and said variance is $4N\sigma^2(\sigma^2+S^2)$. Both said mean and variance of said correlation energy $Z_k$ increase linearly as the number of antenna elements increases. This indicates that performance of said non-coherent detection improves linearly as said number of antenna elements in said smart antenna system increases. Consequently, said phase diversity technique, through said correlation energy $Z_k$, increases the signal-to-interference ratio (SIR) by nearly N-times where N is said number of antenna elements in said smart antenna system. It is important that there is no said weight computation involved in achieving said phase diversity gain.

Figure 4:
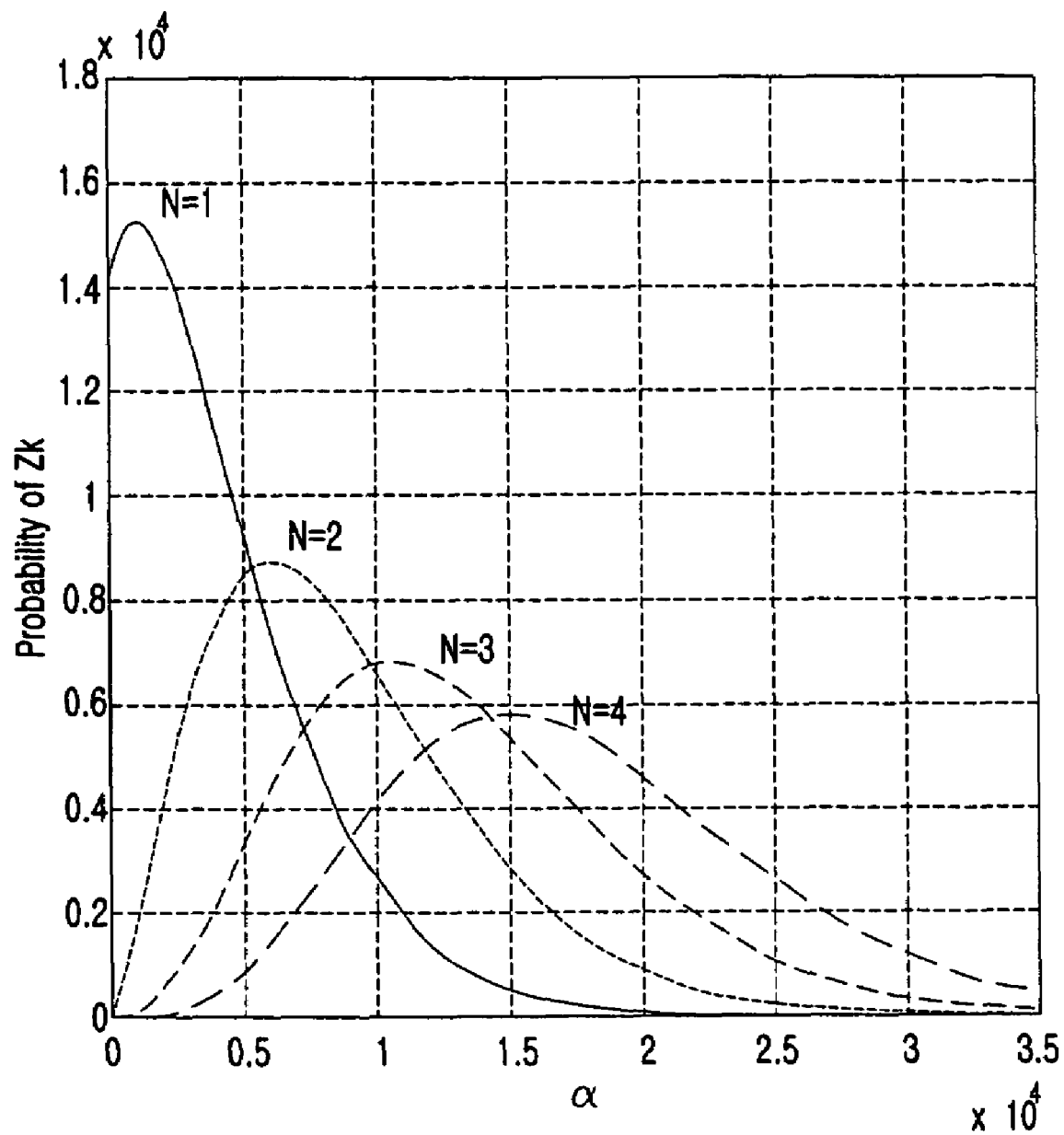
FIG. 4 illustrates performance of said phase diversity technology when $S_{l,k}=50$ and $\sigma^2=1000$. It can be observed that distribution of energy $(Z_{l,k})$ is more concentrated as number of antenna is increased.
Figure 5:
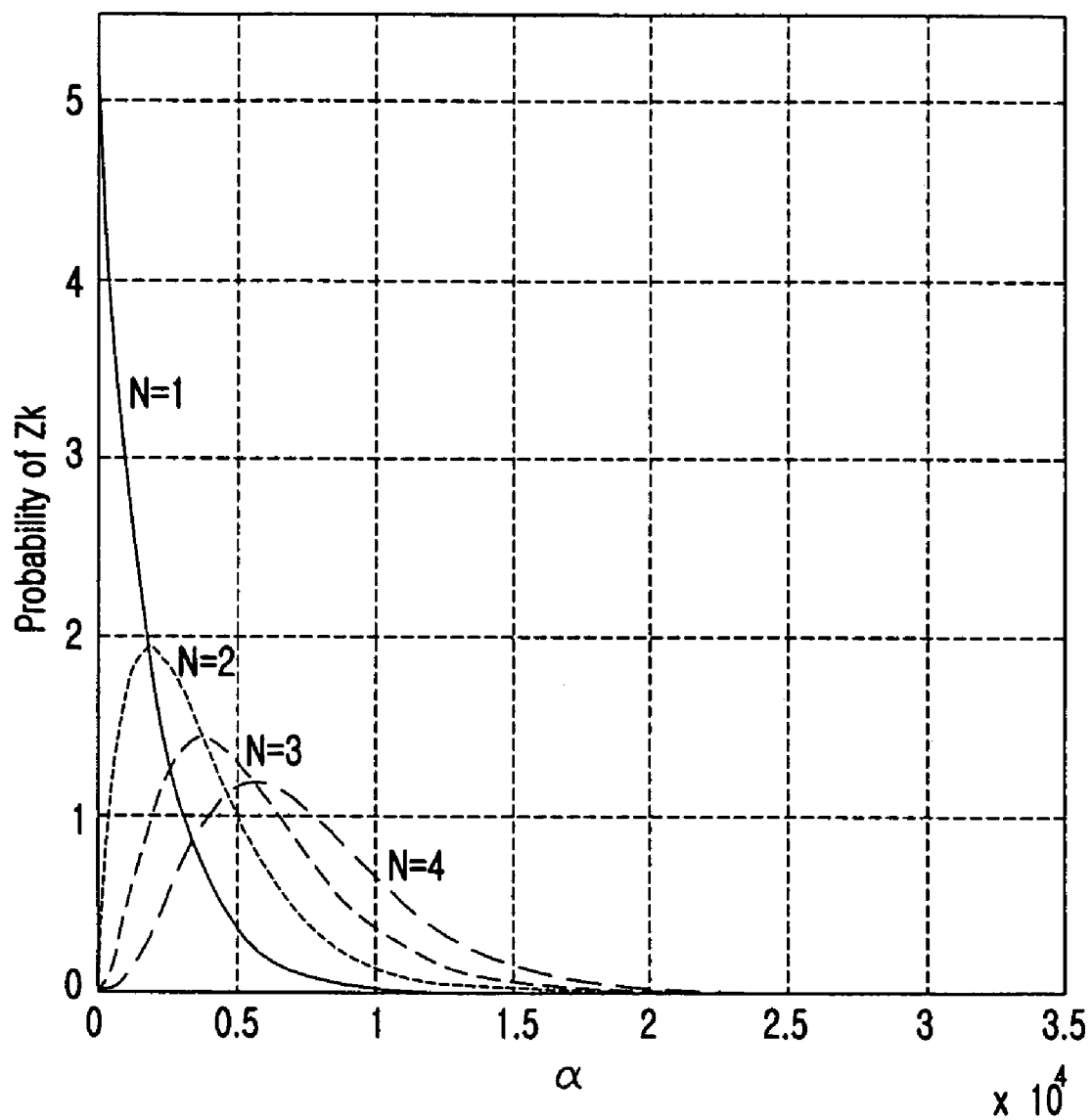
FIG. 5 illustrates performance of said phase diversity technology when $S_{l,k}=0$ (no desired signal) and $\sigma=1000$. It can be observed that distribution of energy $(Z_{l,k})$ is more concentrated as number of antenna is increased.
Figure 6:
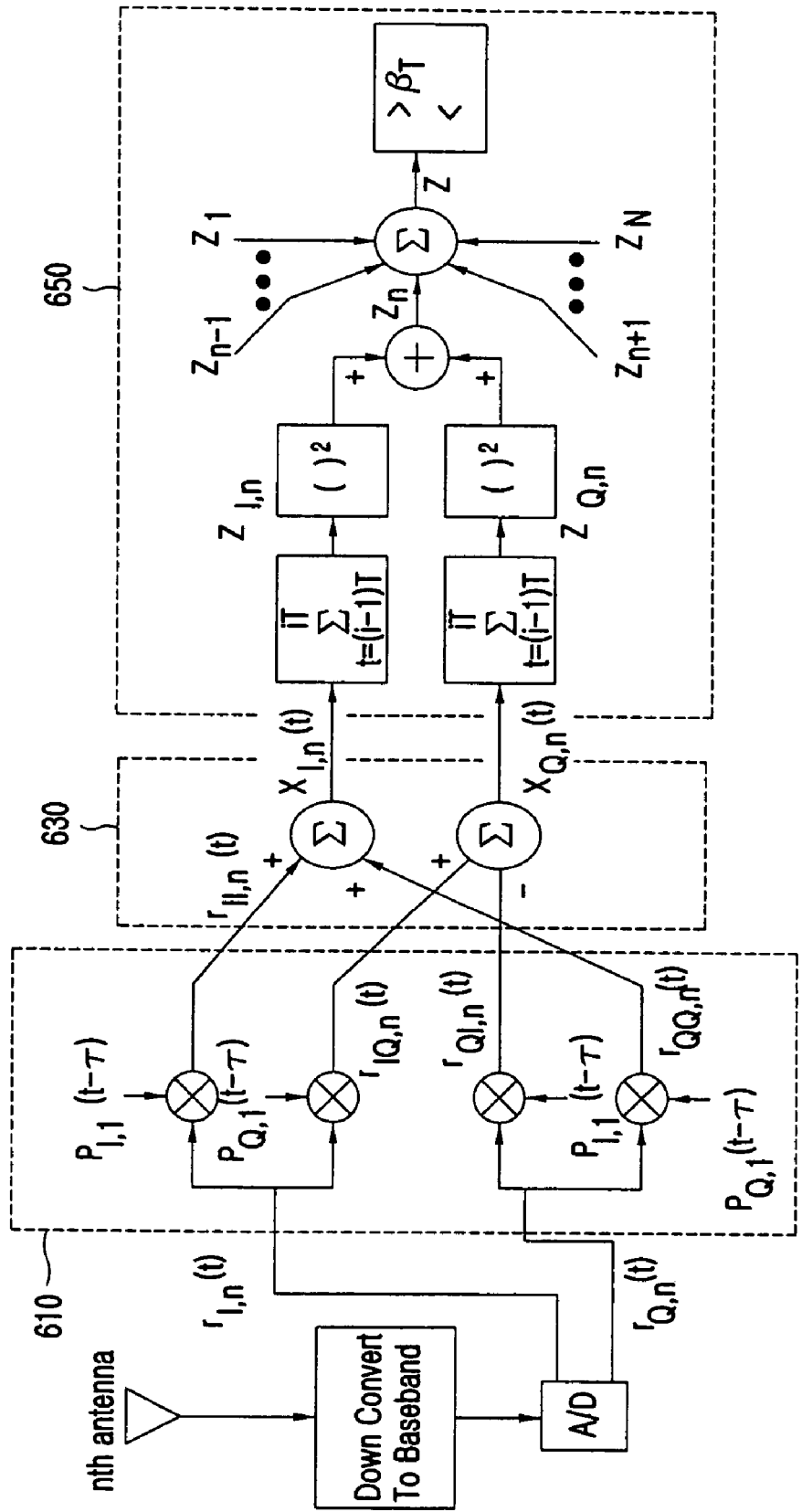
FIG. 6 illustrates an example of application of said phase diversity to said searcher operating in reverse link of CDMA mobile communication system.

FIG. 4 and FIG. 5 show said probability distribution of correlation energy $Z_k$ as the number of antenna elements varies from 1 to 4. FIG. 4 shows the case of $S_k=50$, $\sigma^2=1000$, which means there exists-said desired signal; whereas FIG. 5 shows the case of $S_k=0$, $\sigma^2=1000$, which means there is no said desired signal present. FIG. 6 illustrates a block diagram of said searcher applied in an example of CDMA system incorporating said phase diversity technique. In FIG. 6, $P_I(t-\tau)$ and $P_Q(t-\tau)$ denote the I- and Q-component, respectively, of said PN-code corresponding to said desired signal impinging upon said smart antenna system through said l-th path. Objective of said PN-code acquisition is to find said timing information, more specifically, value for time lag $\tau$ in $P_I(t-\tau)$ and $P_Q(t-\tau)$ which provides peak value in said correlation. As subscript k is deleted, said correlation energy Z can be rewritten as $$Z = \sum_{n=1}^{N} [I_n^2 + Q_n^2].$$ [EQUATION 9]

Considering following two hypotheses;
$H_1$: acquisition is achieved
$H_0$: acquisition is not achieved
then, conditional probabilities under these hypotheses are $$p_Z(\alpha | H_0) = \frac{1}{(\sigma^2)^N 2^N \Gamma(N)} \alpha^{(N-1)} e^{-\alpha/2\sigma^2},$$ [EQUATION 10]

$$p_Z(\alpha | H_1) = \frac{(\alpha/\sigma^2 b)^{(N-1)/2}}{2\sigma^2} e^{-\frac{1}{2}(b+\alpha/\sigma^2)} I_{N-1}\left(\sqrt{\frac{b\alpha}{\sigma^2}}\right),$$ [EQUATION 11]

where $\sigma^2=2TM$ in (10), $\sigma^2=2T(M-1)$ in (11), and $b=2TM/(M-0.5)$ with T being said integration interval in computing said correlation energy. From (10) and (11), probabilities of detection and false alarm in a single synchronization test can respectively be given as $$P_F = \Pr\{Z > \beta_T | H_0\} \text{ with } \sigma^2 = 2TM$$ [EQUATION 12]
$$= \int_{\beta_T}^{\infty} \frac{1}{(\sigma^2)^N 2^N \Gamma(N)} \alpha^{(N-1)} e^{-\alpha/2\sigma^2} d\alpha$$

$$P_D = \Pr\{Z > \beta_T | H_1\} \text{ with } \sigma^2 = 2T(M-1)$$ [EQUATION 13]
$$= \int_{\beta_T}^{\infty} \frac{(\alpha/\sigma^2 b)^{(N-1)/2}}{2\sigma^2} e^{-\frac{1}{2}(b+\alpha/\sigma^2)} I_{N-1}\left(\sqrt{\frac{b\alpha}{\sigma^2}}\right) d\alpha.$$

Figure 7:
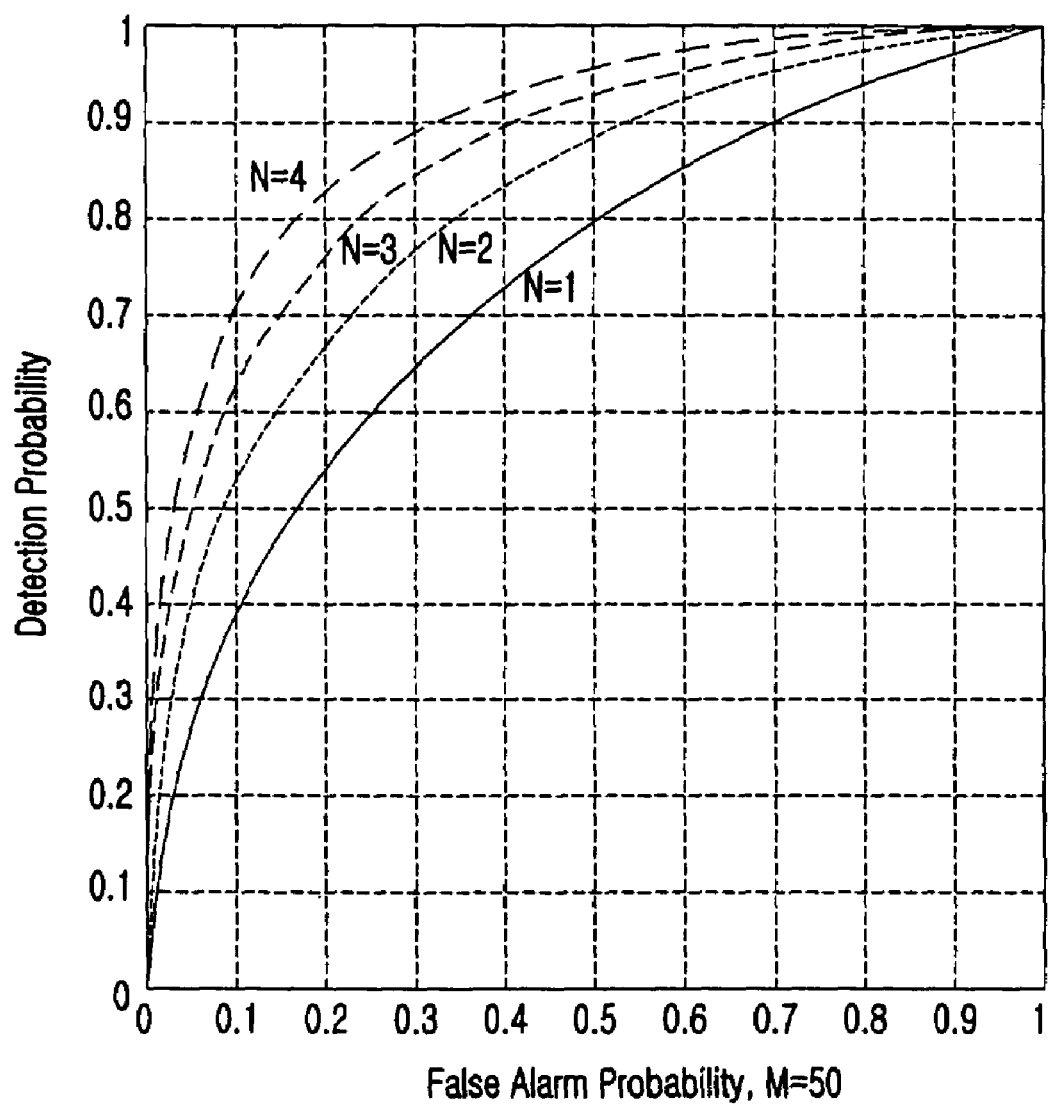
FIG. 7 illustrates theoretical performance of detection probability $(P_D)$ and false alarm probability $(P_F)$ when processing gain (PG), i.e., period for said pilot channel integration, is 64 and number of interferers is 50.
Figure 8:
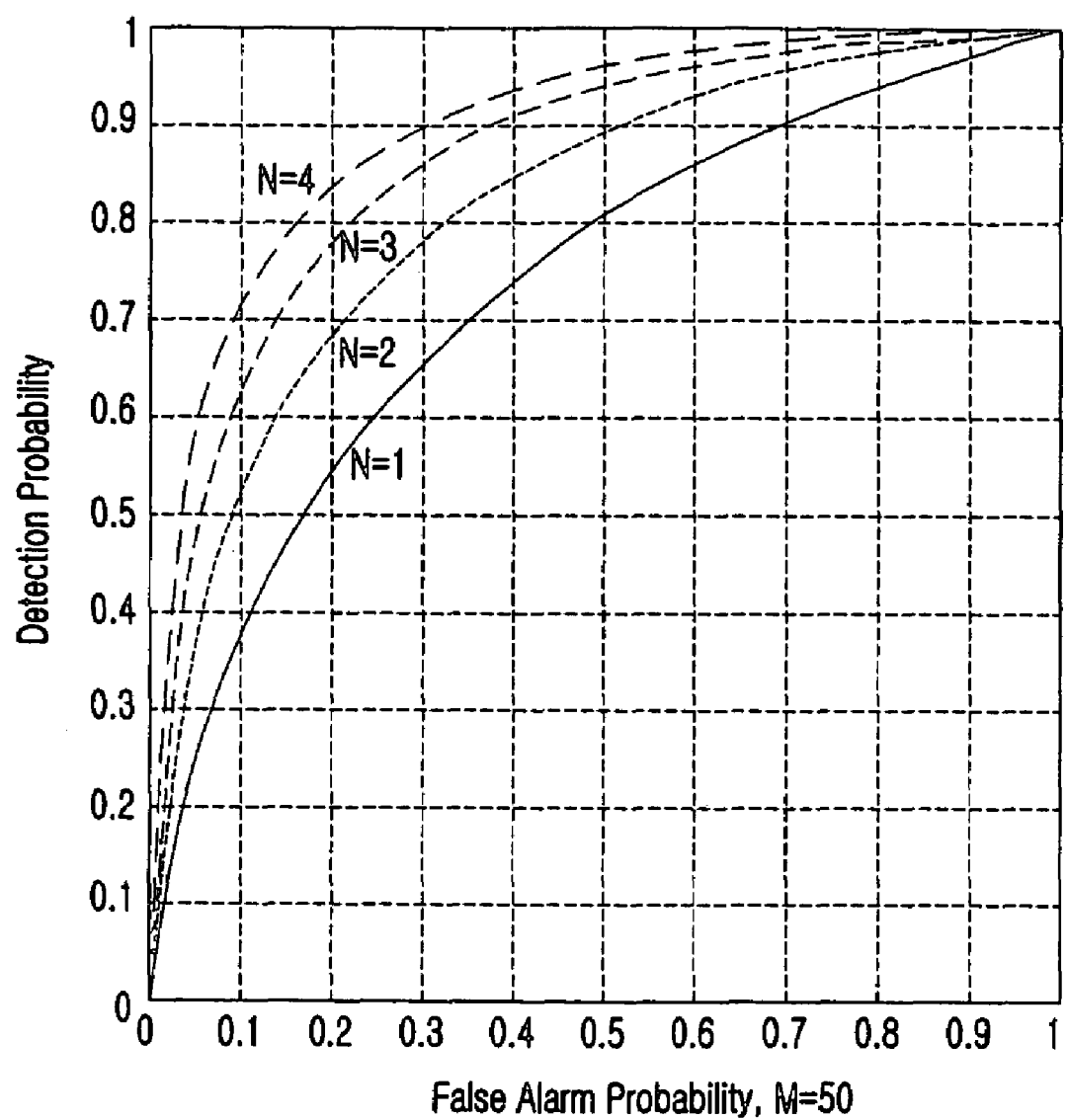
FIG. 8 illustrates simulation performance of detection probability and false alarm probability when processing gain (PG), i.e., period for said pilot channel integration, is 64 and number of interferers is 50.
Figure 9:
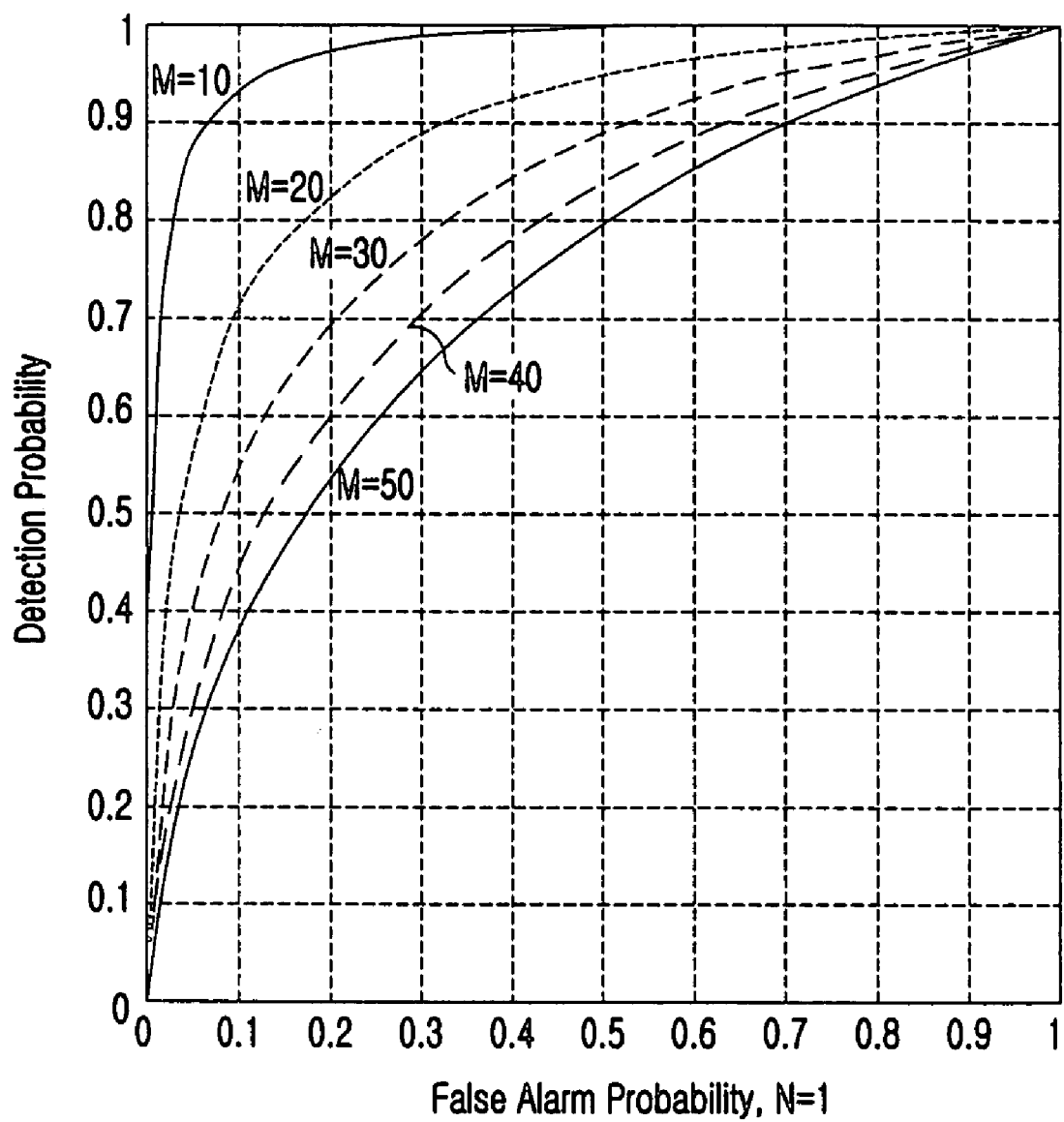
FIG. 9 illustrates theoretical values for $P_F$ and $P_D$ when number of antenna elements is one.
Figure 10:
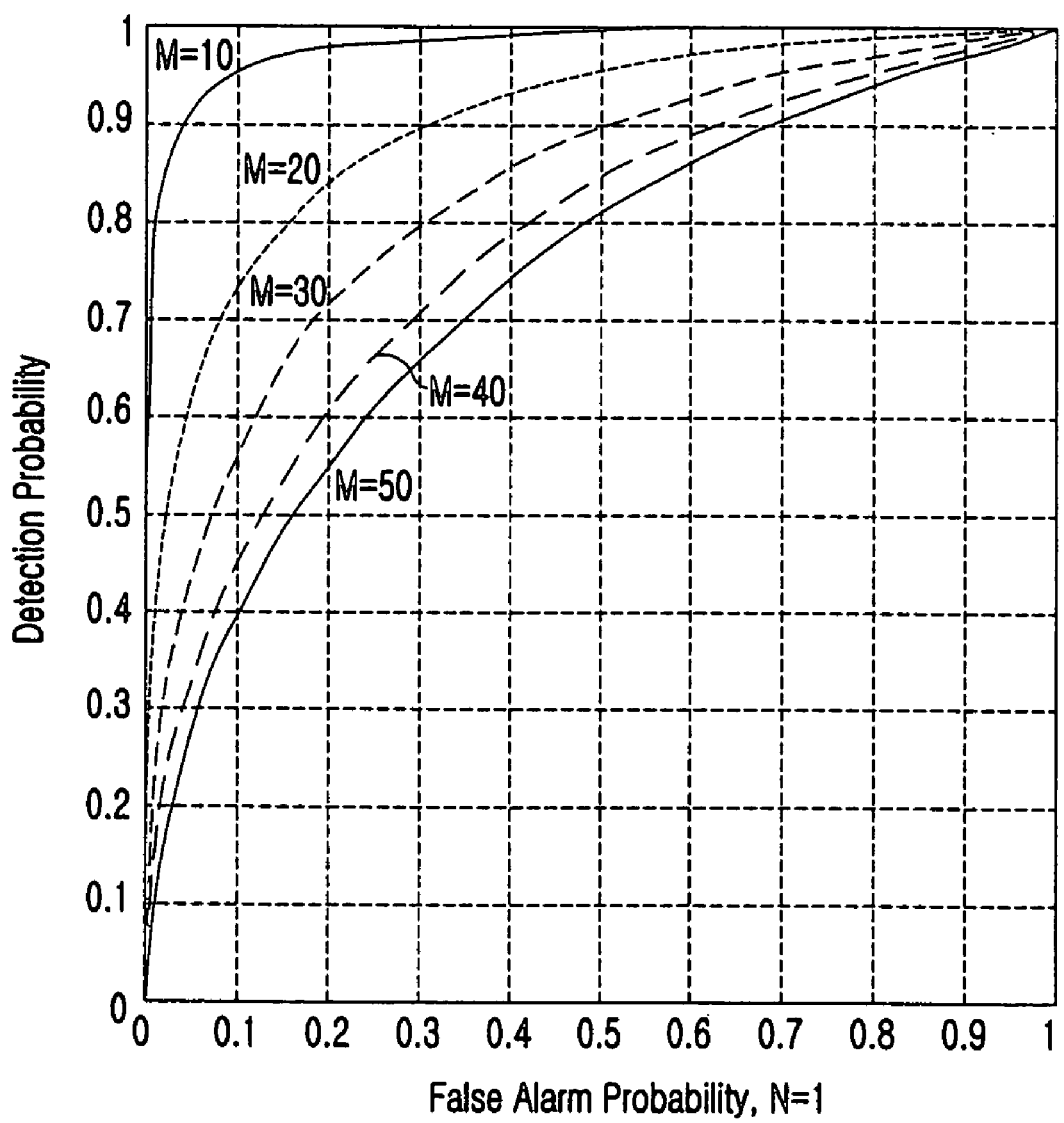
FIG. 10 illustrates simulation values for $P_F$ and $P_D$ when number of antenna elements is one.

Solving equation (12) and (13) for, $\beta_T$, theoretical values for said detection probability and false alarm probability can be obtained. FIG. 7 shows said theoretical values of said detection and false alarm probabilities obtained from equation (12) and (13), and FIG. 8 shows corresponding results for real situation obtained from Monte Carlo simulation. In FIG. 7 and FIG. 8, said integration interval T has been set in such a way that the number of chips in said integration interval becomes 64. It means that processing gain of 64 has been exploited during said searching procedure. Number of said interferers has been set to be 50. FIGS. 9 and 10 show said detection probability and false alarm probability for a single antenna system as a function of number of said interferers. It is worthwhile to note that the performance of a searcher in a given CDMA receiver is drastically enhanced by said phase diversity-technology. For instance, as shown in FIG. 8, said smart antenna system with 4 antenna elements incorporating said phase diversity technique can tolerate 50 of said interferers while conventional one-antenna system can tolerate only 20 of said interfering users to maintain comparable searching performance. This implies that communication capacity is increased by nearly 2.5 times for said PN-code acquisition. This improvement is due to 4 dB gain in SIR through said phase diversity technique in said smart antenna system of 4 antenna elements.

The main contribution of said phase diversity technology is that said smart antenna system can be made to outperform normal one-antenna systems even from initial stage when optimal said weight vector is not available.

Said demodulation apparatus with above-described structures and functions makes it possible in said smart antenna system that each user be tracked accurately and high speed wide-band communication be provided by weighting said received data carried in said traffic channels in symbol-rate with said weights computed from said pilot channel in the reverse link.

Said demodulation apparatus disclosed is for each user's channel card. As an example, said channel card with four said finger at each user's channel card has been introduced in this document. However, it is clear to any people of this field that number of said fingers to be assigned at each user can be set with any proper selection depending on given signal environment and/or convenience.

Figure 11:
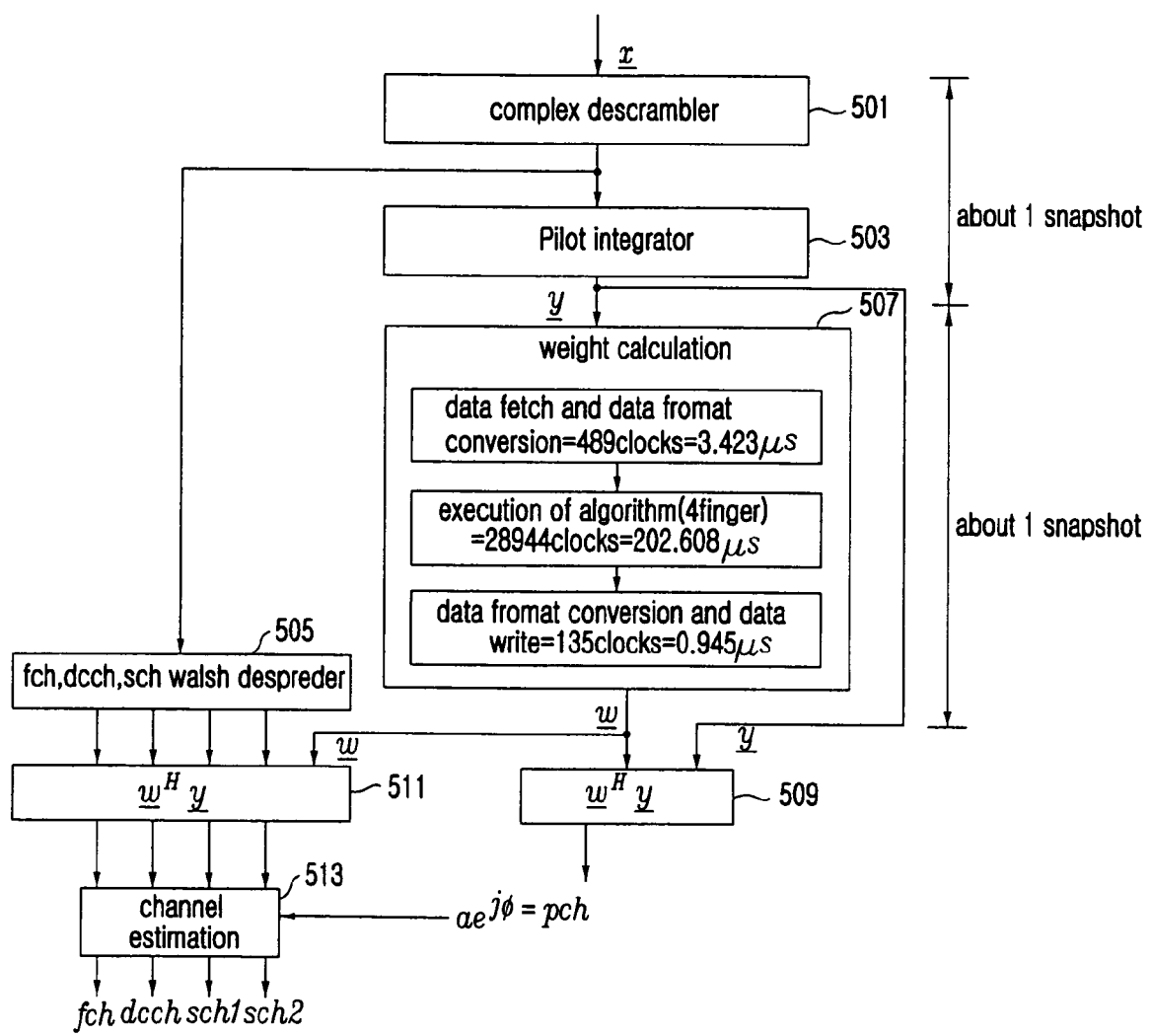
FIG. 11 illustrates a flow-chart of a desirable example of said demodulation method using said finger operating in symbol-rate disclosed in this invention.
Figure 12:
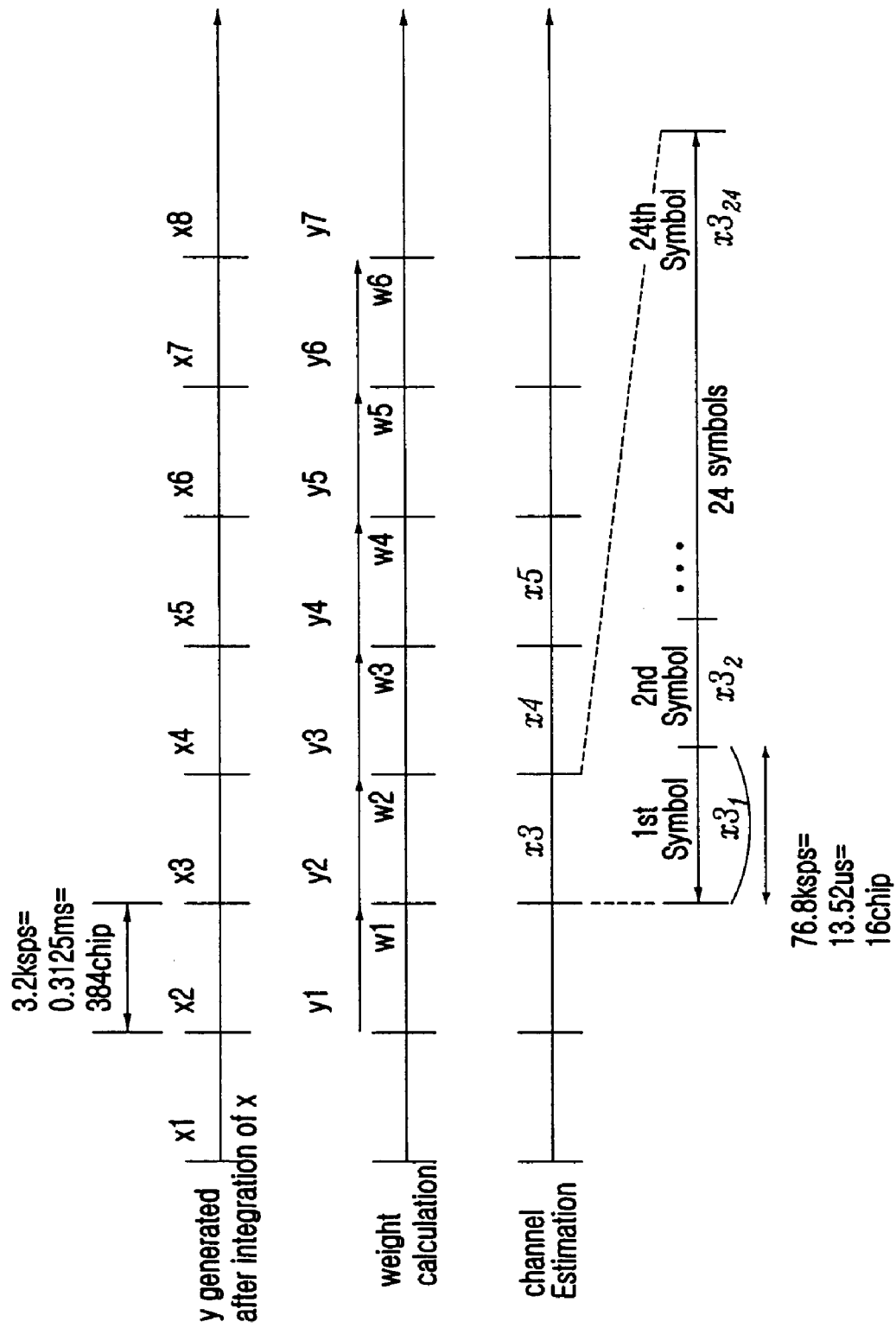
FIG. 12 illustrates how much delay is encountered in procedure of symbol-rate weighting itself in FIG. 11.

FIG. 11 illustrates a flow chart of said demodulation method using said finger in which said received signal are weighted in said symbol-rate as described in this invention. FIG. 12 illustrates how much processing delay is encountered in said demodulation procedure adopting said finger that operates in said symbol-rate.

According to FIG. 11, said demodulation method disclosed in this invention can be explained as follows: said received signal is descrambled in said complex descrambler (501) using said frame timing information (f_timing) by multiplying said received signal by said PN-code. Then, said pilot signal is produced by integrating (503) said descrambled data in order to use as input signal for computing said weight vector. Said beam-forming parameter, i.e., said weight vector, is computed (507) from said descrambled received signal and said pilot signal. Computing time required for obtaining said weight vector is dependent upon processor and algorithm used in said weight vector computing part, although it has been written as being a single snapshot period in example shown in this invention.

After said received signal is multiplied by said weight vector in said pilot weighting part, results of multiplications are summed up to produce weighted pilot signal (509). When said pilot signal is multiplied by said weight vector, it is desirable to weight the said pilot signal through calculation of phase delay, which is delay between reference antenna and each antenna element.

Then, each signal at traffic channels is retrieved separately (505) by correlating said array output with each of Walsh codes assigned to each corresponding channel. Also, said weighted pilot signal for compensating said phase distortion is applied to each of traffic channels separately to produce phase-compensated data (513).

In FIG. 12, period written as x1, x2, . . . , x8 denotes said integration period for descrambling said received signal in said pilot signal generating part (120). Results of said integrations are denoted as y1, y2, . . . , y7, respectively.

Said weight vector computing part (130) receives two inputs, one is said x_vector and the other is y_vector. As said y_vector is integration result of said x_vector, y1 in FIG. 12 is available after said integration of corresponding x1 is completed. Similarly, as weight vector w1 uses both said x1 and y1, said weight vector w1 is available after consuming another computation time, which is assumed as being one snapshot period for easy explanation. Said weight vector w1, which is multiplied by output y2 of pilot integrating part (12), is used for channel compensation of symbol duration denoted by x31.

From above, it is analysed that received signal for duration of x1 is applied to x3 which is delayed two computation time. This result comes from condition that there are no butters between each block. If buffering blocks are used in this invention, even though time for obtaining result is delayed (when w1 is applied to x1 duration, time for channel compensation is delayed as two computation time is necessary), performance degradation due to two computations delayed x3 can be avoided.

Processing means according to this invention can be implemented through software and recorded on recording medium (CD-ROM, ROM, RAM, floppy disk, hard disk, magnetic-optical disk, etc.) that can be read through computer program for implementing.

This invention takes an example of apparatus operating in CDMA2000 (called IS-2000 or IMT-2000) but it is clear that said finger disclosed in this invention can be applied to such as WCDMA. Also, said data rate of traffic channels is to help understand meaning of this invention and not confined to CDMA2000 system.

Optimum weight vector can be calculated by using said pilot signal in 3G mobile communication systems, because said traffic signal and said pilot signal are transmitted from mobile station. Symbol-rate weighting is possible because optimum weight vector using said pilot signal is applied to each traffic channel after Walsh despreading. If symbol-rate weighting and chip-rate weighting is compared, symbol-rate weighting has following properties: In symbol-rate weighting, number of necessary complex descrambling parts is same as number of antenna element and application speed of weight is reduced to symbol-rate and another integration is not necessary when pilot signal is detected for channel compensation, because despreaded pilot signal is weighted. Also, time difference in symbol-rate method between computed weight vector and received signal to which computed weight vector is applied is faster than chip-rate weight method.

According to this invention, interference can be reduced dramatically and capacity of communication be increased as weighting information is extracted from pilot channel which can have long integration interval. Also, performance of searcher and tracker can be enhanced when said phase diversity technology is used. System performance is enhanced remarkably as exact phase compensation is accomplished by multiplying pilot signal received from array antenna with weight vector obtained from weight-vector computing part.

In the technique areas that are related to this invention, anyone with common knowledge of college-graduate level can recognize that any changes or modifications within the limit of this invention are possible from the figures and explanations in this document.

What is claimed is:

1. A finger operating in symbol-rate, comprising:
   descrambling means that descrambles base-band received signal using frame time information by multiplying base-band digital signal by PN-code;
   pilot integrating means that produces pilot signal by integrating descrambled signal from said descrambling means;
   weight vector computing means that produces weight vector using signals from said descrambling means and said pilot integrating means;
   pilot weighting means for producing phase compensating signal to compensate phase delay of channel by multiplying the weight vector from said weight vector computing means with the pilot signal;
   Walsh despreading means for providing received data for each of traffic channels, by integrating multiplied signals each of the channels for corresponding code length time, after multiplying outputs of said descrambling means and corresponding Walsh codes;
   traffic channels weighting means in symbol-rate for weighting each traffic channel signal from the Walsh despreading means by using the weight vector; and channel compensation means for compensating phase distortion caused by phase delay to each output of said Walsh despreading means by using output of said pilot weighting means and traffic channels weighting means.

2. The finger according to claim 1, further comprises tracking means for producing a frame tracking information for compensating small changes in path delay.

3. The finger according to claim 2, wherein said tracking means produces the frame tracking information from difference between two energies which are obtained by integrating results of early and late descrambling wherein a first and a second synch time information are used, respectively.

4. The finger according to claim 2, wherein said tracking means produces the frame tracking information from difference between two energies which are obtained by squaring weighted sums of integrations of descrambled signals provided through early and late descrambling wherein a first and a second synch time information are used, respectively.

5. The finger according to claim 2, wherein said tracking means produces the frame tracking information from difference between two energies which are obtained by squaring results of integrations of weighted sums between the weight vector and descrambled signals provided through said early and late descrambling wherein a first and a second synch time information are used, respectively.

6. The finger according to claim 3, wherein said tracking means produces the frame tracking information from difference between two energies which are obtained by integrating results of said early and late descrambling wherein the first and the second synch time information are used, respectively, such the frame tracking information is produced after filtering said difference between said two energies.

7. The finger according to claim 4, wherein said tracking means produces the frame tracking information from difference between two energies which are obtained by integrating results of said early and late descrambling wherein the first and the second synch time information are used, respectively, such the frame tracking information is produced after filtering said difference between said two energies.

8. The finger according to claim 5, wherein said tracking means produces the frame tracking information from difference between two energies which are obtained by integrating results of said early and late descrambling wherein the first and the second synch time information are used, respectively, such the frame tracking information is produced after filtering said difference between said two energies.

9. The finger according to claim 3, wherein the first synch time information for said early descrambling is earlier than the frame timing information by about 0.2 to 0.5 chip duration while the second synch time information for said late descrambling is later than the frame timing information by about 0.2 to 0.5 chip duration.

10. The finger according to claim 4, wherein the first synch time information for said early descrambling is earlier than the frame timing information by about 0.2 to 0.5 chip duration while the second synch time information for said late descrambling is later than the frame timing information by about 0.2 to 0.5 chip duration.

11. The finger according to claim 5, wherein the first synch time information for said early descrambling is earlier than the frame timing information by about 0.2 to 0.5 chip duration while the second synch time information for said late descrambling is later than the frame timing information by about 0.2 to 0.5 chip duration.

12. The finger according to claim 1, wherein said descrambling means multiplies the received signal in digital state (I_rx, Q_rx) with a local PN-code using a finger timing information (f_timing) provided from outside finger.

13. The finger according to claim 1, wherein said pilot integrating means retrieves the pilot signal to be used as input of weight vector computing means by integrating output (y vector signal) of said descrambling means for preset period of time.

14. The finger according to claim 13, wherein said weight vector computing means produces the weight vector (Weight_I, Weight_Q) using the x_vector signal and the y_vector signal.

15. The finger according to claim 14, wherein said weight vector computing means is reset to initial state upon reception of frame reset signal (f_reset) which is generated by finger death signal (f_death) when the PN-code acquisition is lost such that PN-code acquisition for lost path can be restarted with initial state.

16. The finger according to claim 13, wherein said pilot weighting means calculates phase delay associated with desired signal at each antenna element by using the weight vector from said weight vector computing means to compensate phase delay of each traffic channel.

17. The finger according to claim 1, wherein said Walsh despreading means includes:
    FCH (fundamental channel) despreading means for retrieving data transmitted through FCH (fundamental channel) by multiplying result of said descrambling of an array output with the Walsh code corresponding to the FCH;
    DCCH (dedicated control channel) despreading means for retrieving data transmitted through DCCH (dedicated control channel) by multiplying result of said descrambling of the array output with the Walsh code corresponding to the DCCH;
    SCH 1 (Supplemental channel 1) despreading means for retrieving data transmitted through SCH 1 by multiplying result of said descrambling of the array output with the Walsh code corresponding to the SCH 1; and
    SCH 2 (Supplemental channel 2) despreading means for retrieving data transmitted through SCH 2 by multiplying result of said descrambling of the array output with the Walsh code corresponding to the SCH 2.

18. The finger according to claim 17, wherein said traffic channels weighting means comprises:
    FCH weighting part for compensating phase from reference antenna by weighting the FCH in symbol-rate;
    DCCH weighting part for compensating phase from reference antenna by weighting the DCCH in symbol-rate;
    SCH 1 weighting part for compensating phase from reference antenna by weighting the SCH 1 in symbol-rate; and
    SCH 2 weighting part for compensating phase from reference antenna by weighting the SCH 2 in symbol-rate.

19. The finger according to claim 18, wherein said channel compensating means is located for compensating said phase distortion due to path delay associated with each of traffic channels the FCH, the DCCH, the SCH 1, and the SCH 2.

20. The finger according to claim 19, wherein said tracking means includes: first complex descrambling means for multiplying the received signal with the PN-code of ½ chip advanced time to the f_timing;
    p1 second complex descrambling means for multiplying the received signal with the PN-code of ½ chip retarded time to the f_timing;
    first and second energy estimation means for providing correlation energies by integrating results of said early descrambler and late descrambler, respectively; and tracking information (f_trk) generating means for providing the tracking information (f_trk) by comparing magnitudes of results of said first and second energy estimation means.

21. A demodulation apparatus that uses fingers operating in symbol-rate for mobile communication system comprising:
analog-to-digital converter (ADC) for converting analog signal, which has been frequency-down converted to base-band, to corresponding digital signal through oversampling procedure;
searcher for transmitting a searcher-energy that exceeds preset threshold value to lock detector while the searcher-energy is computed through correlation procedure between outputs of said ADC and a PN-code corresponding to pilot channel;
lock detector for generating signals needed for accurate frame synchronization including frame reset information (f_reset), frame timing information (f_timing), frame death information (f_death) using said correlation energy provided from said searcher; and
at least one finger for weighting in symbol-rate traffic channel signals with weights which are obtained from received data in the pilot channel of a reverse link.

22. The demodulation apparatus according to claim 21, wherein said finger comprises:
descrambling means that descrambles base-band received signal using frame time information by multiplying base-band digital signal by the PN-code;
pilot integrating means that produces pilot signal by integrating descrambled signal from said descrambling means;
weight vector computing means that produces weight vector using signals from said descrambling means and said pilot integrating means;
pilot weighting means for producing phase compensating signal to compensate phase delay of channel by multiplying the weight vector from said weight vector computing means with the pilot signal;
Walsh despreading means for providing received data for each of traffic channels, by integrating multiplied signals each of the channels for corresponding code length time, after multiplying outputs of said descrambling means and corresponding Walsh codes;
traffic channels weighting means in symbol-rate for weighting each traffic channel signal from the Walsh dispreading means by using the weight vector; and
channel compensation means for compensating phase distortion caused by phase delay to each output of said Walsh despreading means by using output of said pilot weighting means and traffic channels weighting means.

23. The demodulation apparatus according to claim 22, wherein said finger further comprises tracking means for producing the frame tracking information from difference between two energies which are obtained by integrating results of said early and late descrambling wherein said first and second synch time information are used, respectively, in order to produce the frame tracking information for compensating small changes in path delay.

24. The demodulation apparatus according to claim 21, wherein said searcher comprises:
received signal processing means for achieving envelope detection of the received data such that the correlation energy to be obtained at each antenna channel;
adding means for summing up the correlation energies at each of antenna channels obtained from said received signal processing means; and output means for generating result of said adding means as final output of non-coherent detection.

25. The demodulation apparatus according to claim 24, wherein said received signal processing means comprises: first arithmetic means for computing magnitude of said correlation energy at each antenna channel by adding results of square of processing results along I-channel and Q-channel; and second arithmetic means for summing up results of computed magnitude of said correlation energy at each of antenna channels.

26. A computer-readable recording medium for recording a program that embodies a method using fingers operating in symbol-rate comprising:
a first function of descrambling received signal by multiplying a PN-code with a received signal using frame timing information (f_timing);
a second function of generating a pilot signal obtained by integrating a descrambled signal in order to use it for computing weights;
a third function of computing a weight vector using the descrambled signal and the pilot signal;
a fourth function of generating a phase compensating signal to compensate phase delay of channel by multiplying the weight vector with the pilot signal;
a fifth function of providing received data for each of traffic channels, by integrating multiplied signals each of the channels for corresponding code length time, after multiplying the descrambled signal and corresponding Walsh codes;
a sixth function of weighting each traffic channel signal by using the weight vector of each channel in symbol-rate; and
a seventh function of compensating phase distortion due to channel delay by using a phase compensating signal to weighted traffic signal.

* * * * *